May 20, 1941.  C. E. COCHRAN  2,242,453
AXLE CONSTRUCTION
Filed Nov. 8, 1938  2 Sheets-Sheet 1

INVENTOR.
CLYDE E. COCHRAN
BY Bates, Golrick & Teare
ATTORNEYS

Patented May 20, 1941

2,242,453

UNITED STATES PATENT OFFICE 2,242,453

AXLE CONSTRUCTION

Clyde E. Cochran, Cleveland, Ohio, assignor to The Elwell-Parker Electric Co., Cleveland, Ohio, a corporation of Ohio Application November 8, 1938, Serial No. 239,471

4 Claims. (Cl. 280—112)

The present invention is concerned with industrial truck structures, and the general object thereof is the provision of an improved trailer axle construction.

Another object of the present invention is the provision of an improved trailer axle connecting mechanism for an industrial truck, which will permit the axle to rock freely relative to the truck chassis when either of the wheels on the axle encounter an obstruction.

A still further object of the present invention is the provision of a connecting mechanism for connecting a compensating trailer axle of an industrial truck to the chassis of a truck, in such manner as to permit a completely free pivoting or rocking action of the axle relative to the truck chassis while providing a cushion or spring action between the truck body and the axle.

Other objects and features of the invention will become apparent from the following description relating to the accompanying drawings, showing a preferred form thereof. The essential characteristics are summarized in the claims.

Heretofore, it has been the practice to provide a pivotal connection between the trailer axle and the chassis of an industrial truck. The axis of the pivot extends longitudinally of the truck to permit either of the wheels on the axle to rise relative to the truck chassis. Stability of the axle relative to the chassis was maintained normally by the interposition of a helical spring disposed between the axle and the chassis on each side of the pivotal connection and the compressive strength of the springs was dependent upon the load capacity of the truck. This resulted in the requirement, in many instances, of the use of springs of such high compression range that the trailer axle was prevented from having the desired free rocking or compensating movement to meet the many unfavorable conditions under which the trucks had been placed in use.

By my present arrangement I retain the pivotal connection between the truck chassis and the trailer axle with the axis of the pivot extending longitudinally of the truck, but I arrange the spring members longitudinally of the truck in alignment with the pivotal axis of the axle whereby the axle is completely free to rock relative to the truck chassis. I retain the spring action between the trailer axle and the truck chassis, while at the same time permitting a free rocking of the axle without reactions on the springs. I accomplish the foregoing while protecting the axle against any unfavorable torque influences.

Figure 1:
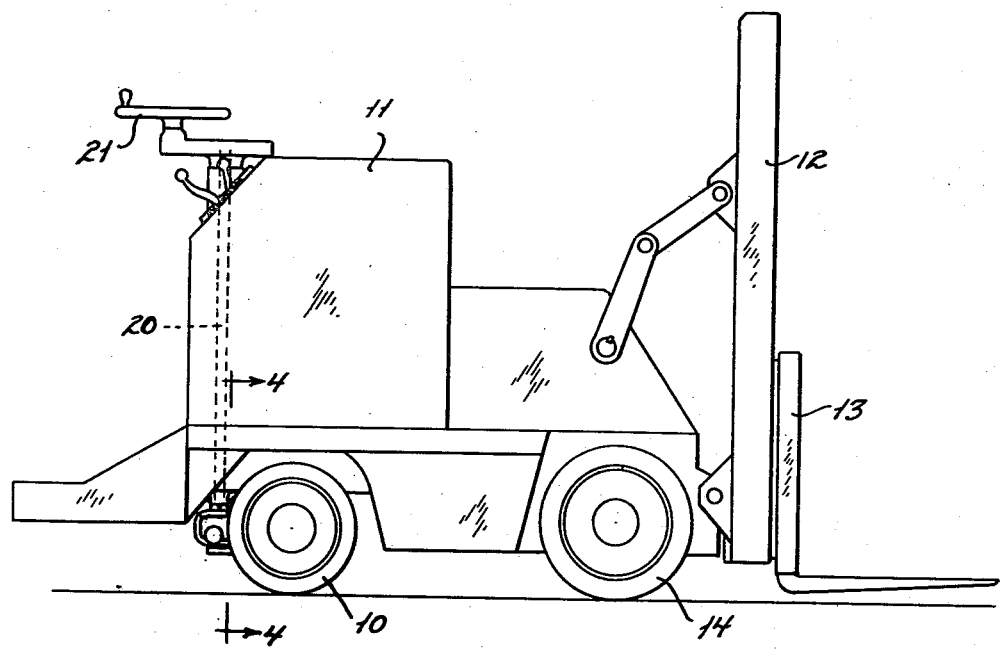
Figure 2:
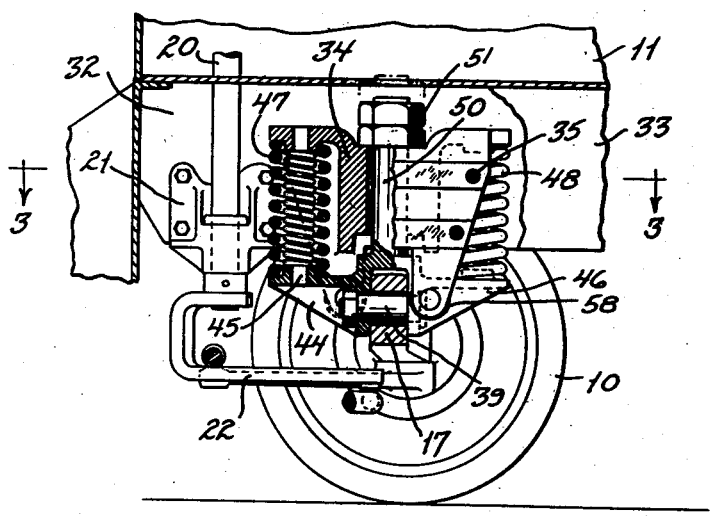
Figure 3:
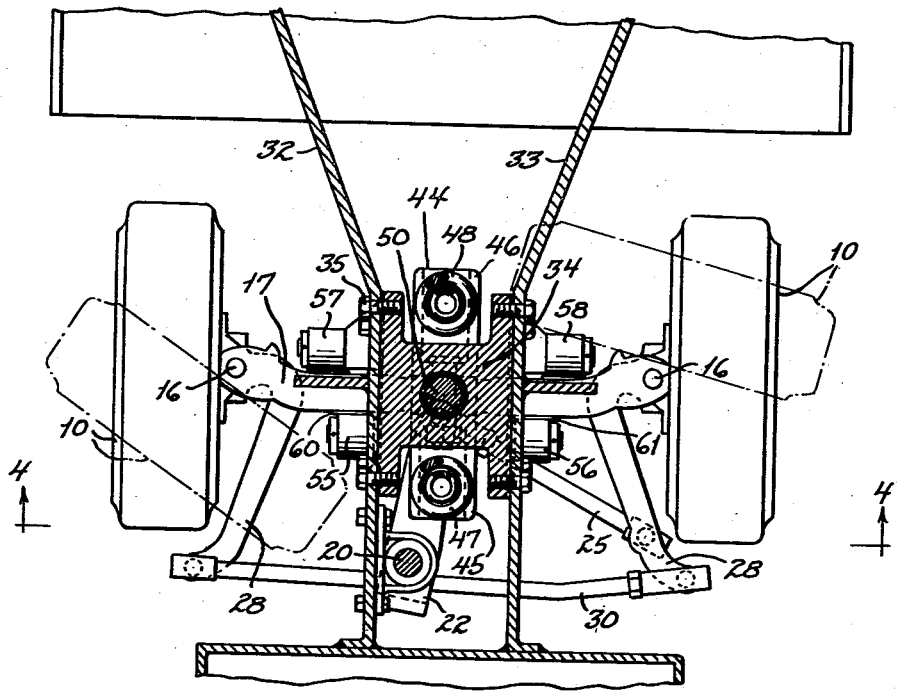
Figure 4:
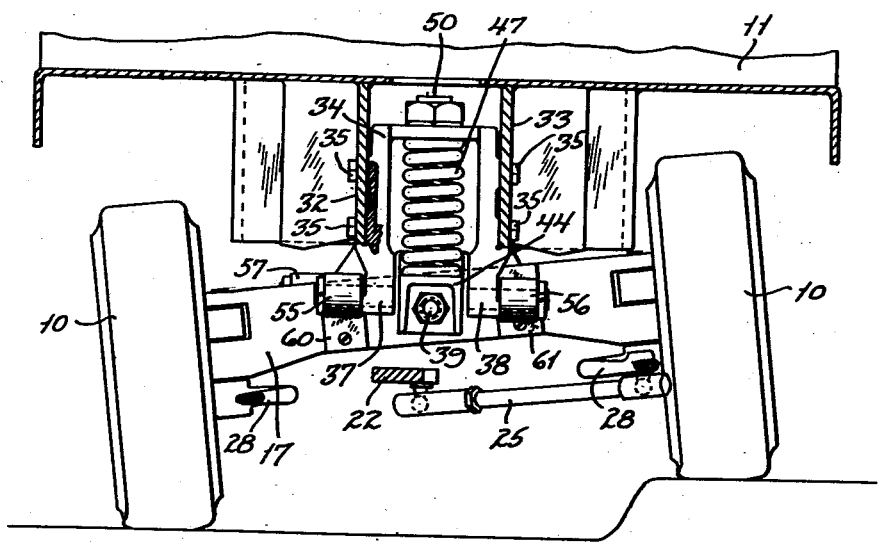

In Fig. 1 of the drawings I show a side elevation of a truck embodying my invention; Fig. 2 is a longitudinal cross-sectional elevation of the trailer axle construction of the truck taken centrally of the axle; Fig. 3 is a cross-sectional plan view of the trailer axle construction taken along the line 3—3 of Fig. 2, and showing its connection to the chassis, and Fig. 4 is a cross-sectional view taken substantially along the line 4—4 of Figs. 1 and 3.

In Fig. 1 of the drawings I show, in a conventional manner, an industrial truck provided at one end with a pair of dirigible wheels 10 disposed beneath a housing 11, the truck being either electrically motor driven with a battery in the housing 11, or mechanically driven by a gas engine disposed within the housing 11. At the forward end of the truck I show an upright frame 12, which is provided with a load elevator 13, the operating mechanism therefor being omitted, inasmuch as the same does not form part of the present invention. A second pair of wheels 14, disposed near the load handling end of the truck, are, in the present instance, power-driven. The wheels 10 are mounted upon steering knuckles 16, supported at the outer ends of a rockable shaft 17.

To steer the wheels I provide a vertically extending steering shaft 20, which is operated through suitable reduction gearing (not shown), and the lower end of the shaft 20 is supported by a bracket 21 on the truck frame and is provided with a U-shaped steering arm 22, which extends toward the axle 17. The steering arm 22 is connected pivotally to a steering link 25, in a suitable operative manner. Arms 28 are connected to the steering knuckles 16, and also are connected to be turned in unison by a cross-rod 30. The link 25 is pivotally connected to one of the arms 28, in the manner shown, so that the wheels 10 may be turned through a wide range of steering angles in unison.

The compensating mechanism for permitting the axle to rock relative to the chassis of the truck construction, while at the same time permitting dirigibility of the wheels 10, and, at the same time provide a spring action between the chassis frame and the axle, will now be described.

Connected to the chassis members 32 and 33 is a spring frame or saddle 34, which is bolted to converging portions of the chassis members 32 and 33 by bolt members 35. The shape of the spring saddle member 34 is such as to have side portions 37 and 38 which extend downwardly along the inside faces of the chassis members 32 and 33 a substantial distance below the bottom edges of the chassis members.

The connection between the spring seat member 44 and the axle 17 comprises a longitudinally extending pivot bolt 39, which passes through an opening centrally formed in the axle member 17, and may be held in place in any convenient manner. It will be noted, as shown in Fig. 2, that the axle fits into a transverse slot-like formation formed in the lower end of a spring seat member 44, which is provided with spring seats 45 and 46 upon which rests spring members 47 and 48, disposed forwardly and rearwardly of the axle member 17 and substantially in alignment with the center of the pivot bolt 39. A vertically extending cylindrical portion 50, formed on the spring seat member 44, is slidably fitted in a bore formed in the spring saddle member 34 intermediate the location of the two spring members 47 and 48. The saddle member 34 and spring members 47 and 48 and the spring seat member 44 are held in compressive relation by a pair of lock nuts indicated at 51 in Fig. 2, which can be adjusted to about the desired amount of compression of the spring members 47 and 48.

To assure only a vertical rocking of the axle member 17 relative to the chassis of the truck, I provide a means for preventing distortion upon the axle member 17 which may comprise a pair of roller members 55 and 56, and a pair of roller members 57 and 58, which are disposed, respectively, forwardly and rearwardly of the axle member 10, in juxtaposition to the side faces thereof. These rollers may ride upon hard roller plates 60 and 61, 62 and 63, secured to the axle sides. The rollers 55 to 58, inclusive, are mounted upon downward extensions of the spring saddle member 34, whereby the rollers may be disposed in such position that the roller members will not lose contact with the sides of the axle during its maximum rocking movements. Thus, any tendency of torque distortion upon the axle with consequent binding and wear upon the pivot pin is prevented.

It will be apparent that the arrangement of the spring members 47 and 48, forwardly and rearwardly of the axle center, and in alignment with the pivotal axis of the bolt member 39, will permit a free rocking movement of the axle member under varying road conditions, while at the same time a cushion effect by reason of the mechanical arrangement shown, is obtained between the axle member 17 and the chassis members 32 and 33. It should also be noted that the spring seats formed on the spring seat member 44 and the spring saddle member 34 are such that any danger of the spring members becoming displaced or dislocated during the use of the truck, is prevented. Likewise, it will be obvious that the arrangement is such that maximum dirigibility of the wheels 10 can be obtained without undue exertion on the part of the operator.

It also has been found that by reason of this free rocking movement of the trailer axle, and particularly when the truck is operating over warped surfaces or uneven roads, there is practically no loss in the tractive effect of the driving wheels when the device is used upon trucks of relatively short wheel base. Tractive loss has been experienced heretofore in short wheel base trucks, due to the fact that the resistance of spring members interposed between the axle and chassis or load on opposite sides of the pivotal or rocking center of the axle, detract from the tractive properties of the driver wheels.

It will also be apparent that the axle construction is such, that it will permit the wheels to turn through a greater arc than has heretofore been possible with prior axle constructions. The wheels are free to turn at an angle of 75 degrees in either direction from their normal front position, without contacting the supporting structure.

I claim:

1. A connecting mechanism for a trailer axle on an industrial truck comprising in combination, a trailer axle, a vertically shiftable pin block, a pivot pin carried by the lower end of the block and journalled to the axle to permit a free rocking movement of the axle relative to the truck chassis, the pivot pin extending longitudinally of the truck, a spring frame carried by the chassis of the truck having inverted spring seats disposed forwardly and rearwardly of the axle and said frame being journalled for receiving a vertically extending pin on the pin block, spring seat members carried by the pin block forwardly and rearwardly of the axle center in the plane of the longitudinally extending pivot pin spring members interposed between the respective seats on the spring frame and the pin block means for disconnecting the pivot pin from the pin block whereby said axle may be removed from the pin block independently of the assembly of the pin block with the chassis or the spring frame.

2. In an industrial truck, a trailer axle mechanism connected to the trailer chassis including an axle member, a spring rest pivotally connected to the axle member, a spring frame carried by the chassis, helical spring members interposed between the spring rest and the spring frame, a king pin disposed on the spring rest above the axle and between the spring members for connecting the spring rest to the spring frame to permit relative vertical movement therebetween, anti-friction torque stabilizing rollers mounted upon the axle overhanging said spring frame on each side of said king pin and acting forwardly and rearwardly upon the axle, and means for retaining the king pin in engagement with the spring frame whereby the spring rest and spring members may be held in assembled relationship to the spring frame upon removal of the pivotal connection for the axle.

3. In an industrial truck, a trailer axle assembly mechanism connected to the truck chassis including an axle member, a spring frame having inverted spring seats disposed forwardly and rearwardly of the axle member, a spring rest disposed above the axle and a single pivotal means for removably connecting the axle member to the spring rest, said spring rest having spring seats disposed forwardly and rearwardly of the axle and in vertical alignment with the seats on the spring frame, means comprising an upwardly projecting pin for connecting the spring rest to the spring frame to permit relative vertical movement therebetween, torque stabilizing means comprising rollers disposed to act on the axle adjacent the pivotal connection and reacting on the spring frame and means for retaining said pin in engagement with said spring frame upon removal of the pivotal connection for the axle.

4. In an industrial truck, a trailer axle mechanism connected to the truck chassis including an axle member, a spring frame, a spring rest pivotally connected to the axle member, spring members interposed between the spring rest and the spring frame, a single pintle member for removably connecting the spring rest to the spring frame and means for retaining the pintle in engagement with the spring frame whereby the spring rest and spring members may be held in assembled relationship to the spring frame upon removal of the pivotal connection for the axle.

CLYDE E. COCHRAN.